United States Patent [19]

Takasugi

[11] 4,221,369
[45] Sep. 9, 1980

[54] MACHINE VISE

[76] Inventor: Tamotsu Takasugi, 2307-5 Ibara-cho, Ibara-shi, Okayama-ken, Japan

[21] Appl. No.: 92,203

[22] Filed: Nov. 7, 1979

[30] Foreign Application Priority Data

Jun. 28, 1979 [JP] Japan .................................. 54/82407

[51] Int. Cl.³ .............................................. B23Q 3/02
[52] U.S. Cl. ..................................... 269/138; 269/250
[58] Field of Search ............................... 269/134–138, 269/246, 250, 251

[56] References Cited

U.S. PATENT DOCUMENTS

| | | | |
|---|---|---|---|
| 1,405,306 | 1/1922 | Martin | 269/138 |
| 3,312,461 | 4/1967 | Copron | 269/246 |

*Primary Examiner*—Robert C. Watson
*Attorney, Agent, or Firm*—Kurt Kelman

[57] ABSTRACT

A machine vise grasps a given work blank by causing a movable jaw to be moved toward a stationary jaw fixed in position on one end of the vise bed. When the work blank is grasped between the stationary jaw and the movable jaw and the clamping force of the movable jaw is increased, no bending stress is exerted upon the vise bed and a force causing the movable jaw to be directed to the surface of the slide for the movable jaw is applied thereto to thereby increase the force of adhesion of the movabe jaw to the vise bed, with the result that the work blank is prevented from rising off the vise bed, that the rigidity and structural strength of the vise as a whole are increased and that the jaws grasp the work blank therebetween in a state wherein the jaw plates of the jaws keep their postural angle relative to the surface of the slide for the movable jaw at a precise right angle at all times.

5 Claims, 8 Drawing Figures

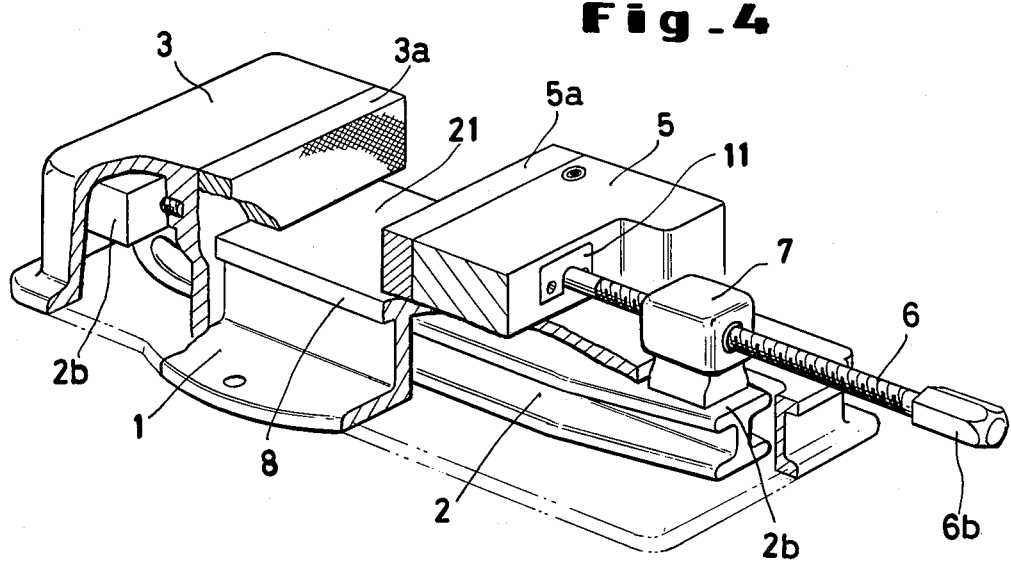
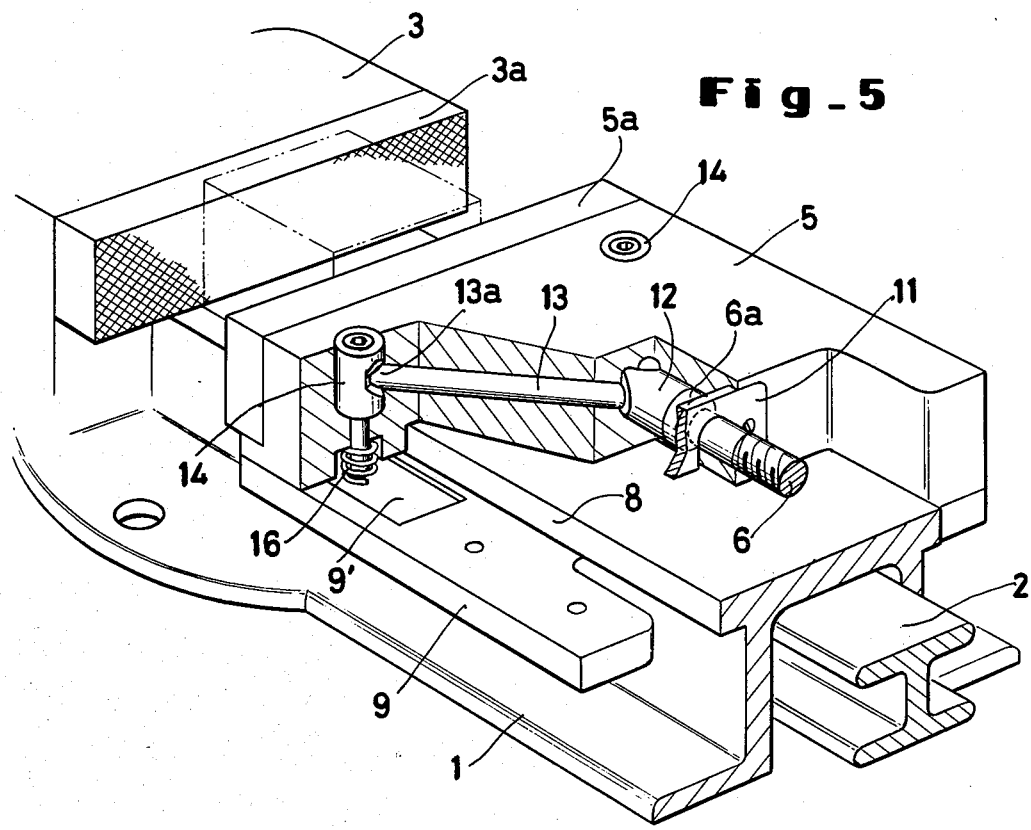

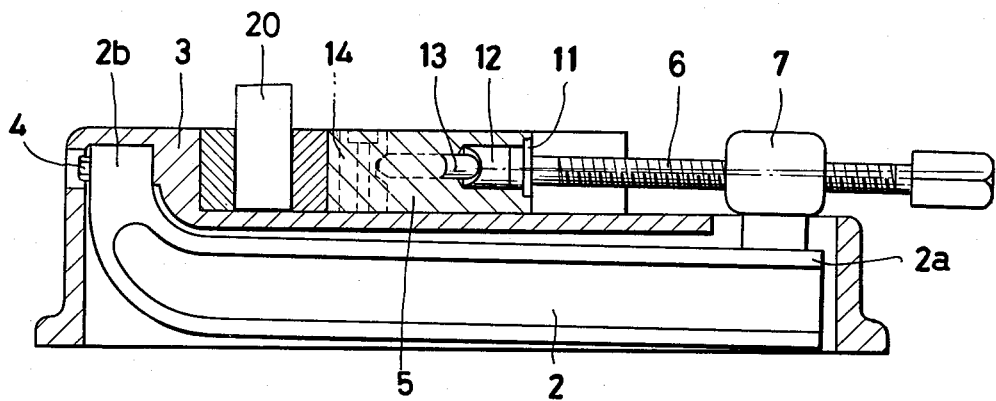
Fig_6
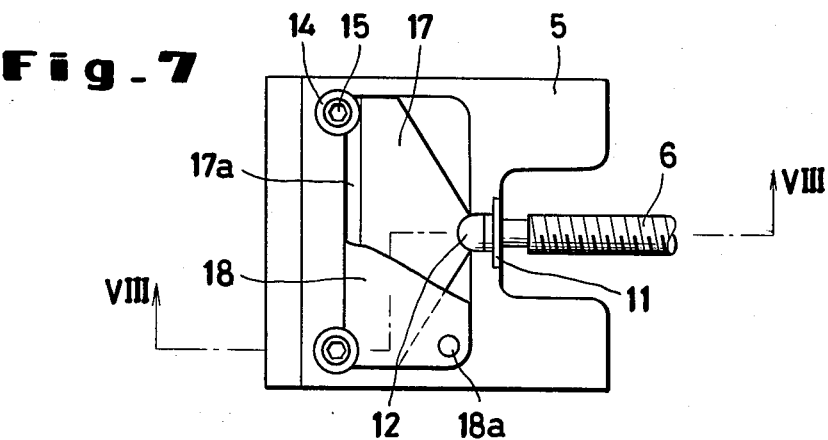
Fig_7
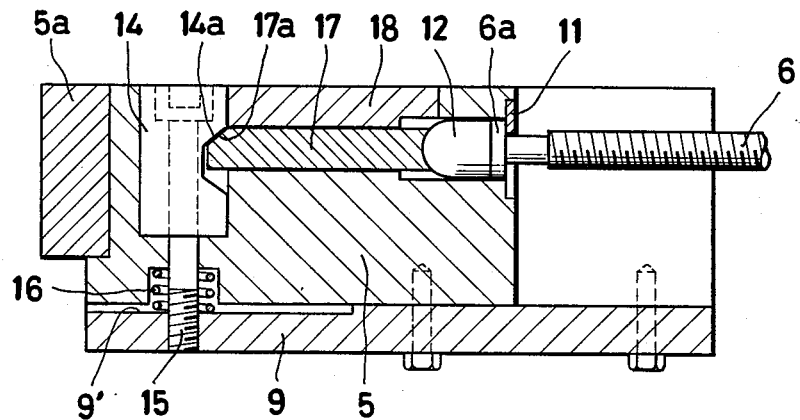
Fig_8

MACHINE VISE

BACKGROUND OF THE INVENTION

The present invention relates to a machine vise. More particularly, this invention relates to a machine vise for grasping a given work blank between parallel jaw plates of a pair of stationary and movable jaws which parallel jaw plates constantly keep their postural angle at a right angle relative to the surface of the slide for the movable jaw.

A vise of the type comprising a stationary jaw fixed in position on a vise bed and a movable jaw mounted on the vise bed in a manner capable of free straight movement toward and away from the stationary jaw so as to be capable of grasping a given article between the parallel jaw plates of the jaws is known to the art. The vise disclosed by Japanese Patent Publication No. Sho-47(1972)-33960 is one example of this type of vise.

One fault common to all vises of this type is the fact that a given article, when grasped by being clamped between the jaws, inclines toward the movable jaw. In machine vises, the normality (expressed in terms of inward angular deviation from a right angle) of the opposed surfaces of the parallel jaw plates relative to the surface of the slide for the movable jaw is preferably not more than 0.03 mm per 100 mm in height of the jaws. The angle of the inclination of the article toward the movable jaw conspicuously differs when the article is grasped in the upper portion of the jaws and when it is grasped in the middle portion of the jaws. Further, there is some possibility that the shape of the article will make it quite difficult to grasp the article between the jaws in a state wherein the parallel jaw plates of the jaws keep their postural angle constantly at a right angle relative to the surface of the slide for the movable jaw. For this reason, in the actual maching operation, a skilled machinist attempts to maintain the jaw plates of the jaws at a right angle relative to the surface of the slide for the movable jaw as by observing the established practice of strongly clamping a given article and hitting the article with a hammer to bring the article into intimate contact with the surface of the slide for the movable jaw in the course of coarse cutting to permit removal of large cuts and, conversely in the subsequent course of fine cutting, weakly clamping the article to permit removal of fine cuts. This practice, however, lacks stability and reliability in the sense that it totally relies on the individual machinist's experience and skill. Some, if not all, articles given to be worked may possibly fail to remain fast in position when they are grasped weakly and, therefore, defy all efforts to give a desired cutting thereto. Depending on the condition of the clamping of an article between the jaws, even a vise of high accuracy is not free from the possibility of yielding an inferior product which is rejectable in terms of dimensional accuracy. There is another possibility that the rigidity which the vise as a whole exhibits when a given article is grasped thereby will fall short of the required level and, as a result, the cutting tool will have its service life greatly shortened.

An object of this invention is to provide a machine vise adapted to permit an article subjected to machining to be grasped between the stationary jaw and the movable jaw in a state wherein the jaw plates of the jaws constantly keep their postural angle at a right angle relative to the surface of the slide for the movable jaw without causing the article to rise off the sliding surface when grasped.

Another object of this invention is to provide a machine vise notably improved in structural strength and rigidity to provide enhanced durability.

SUMMARY OF THE INVENTION

The objects described above have now been accomplished by this invention which provides a machine vise capable of grasping in position an article subjected to machining by means of a stationary jaw and a movable jaw adapted to move straight and freely toward and away from the stationary jaw, which machine vise is characterized by the fact that a driving member serving to impart a forward or backward motion to the movable jaw mounted on the vise bed so as to be freely moved straight toward and away from the stationary jaw is supported in position at one end of an L-shaped frame separately disposed along the entire length of the vise bed and, at the same time, vertical shafts retained in position by bolts planted in guides joined to the movable jaw and a bar or plate serving to transmit the driving force generated by the driving member is interposed between the vertical shafts and the driving member.

In the machine vise of the construction described above, when a work blank is placed between the stationary jaw and the movable jaw and the driving member is operated to move the movable jaw toward the stationary jaw to have the work blank grasped fast between the two jaws, high bending stress develops and has its effect on the vise bed and the jaws. The L-shaped frame which is incorporated inside the vise bed absorbs this bending stress and the vertical shafts which are incorporated within the vise bed function to apply to the movable jaw a force causing it to be directed to the vise bed to thereby increase the force of adhesion of the movable jaw to the vise bed in proportion as the clamping force of the movable jaw increases, with the result that the work blank is prevented from rising off the vise bed (the surface of the slide for the movable jaw), the rigidity and structural strength of the vise as a whole are increased and the jaws grasp the work blank therebetween in a state wherein the jaw plates of the jaws keep their postural angle relative to the vise bed at a precise right angle at all times.

The other objects and characteristics of the present invention will become apparent from the further disclosure of the invention to be given hereinafter with reference to the accompanying drawings.

BRIEF EXPLANATION OF THE DRAWING

FIG. 4 is a partially sectioned perspective view of the vise of FIG. 1.

FIG. 5 is a partially sectioned, enlarged perspective view of the principal portion of the vise of FIG. 1.

FIG. 6 is an explanatory view illustrating the state wherein a work blank is grasped by the vise of FIG. 1.

FIG. 7 is a plan view of a portion of another preferred embodiment of the vise according to the present invention.

FIG. 8 is a sectioned view taken along the line VIII—VIII of FIG. 7.

DESCRIPTION OF PREFERRED EMBODIMENT

Figure 1:
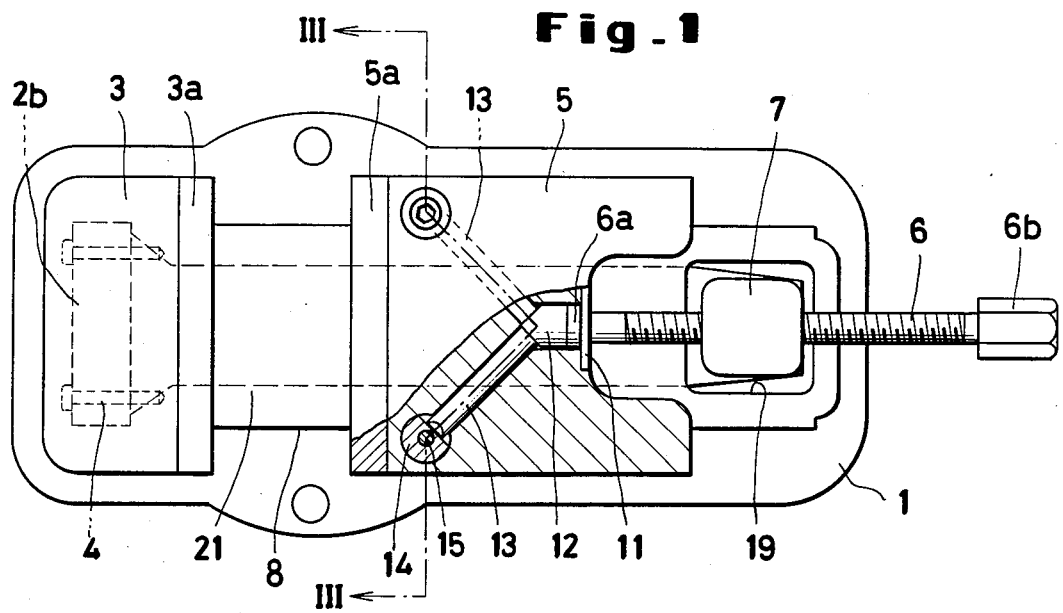
FIG. 1 is a plan view of one preferred embodiment of the vise according to the present invention.
Figure 2:
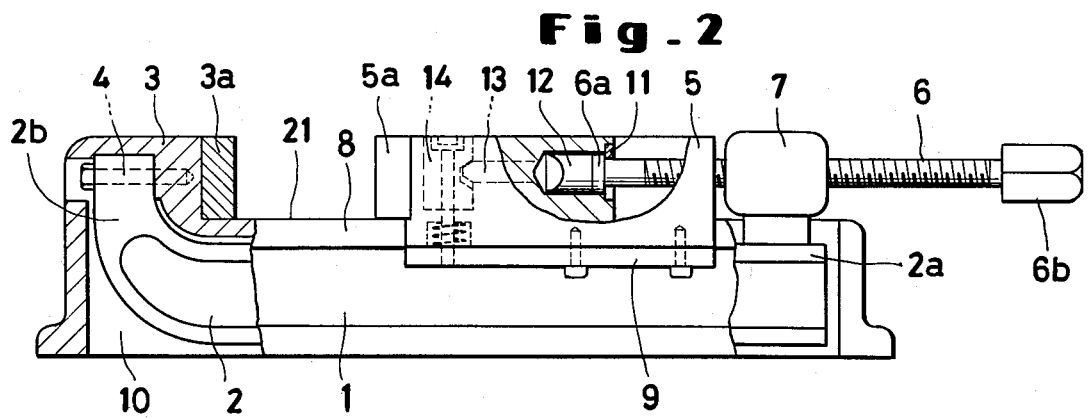
FIG. 2 is a partially sectioned side view of the vise of FIG. 1.

The first embodiment of the machine vise of the present invention will be described with reference to FIGS. 1 to 5. On a vise bed 1 fixed in position on a suitable workbench (not shown), a movable jaw 5 is mounted movably forward and backward relative to a jaw plate 3a of a stationary jaw 3 provided integrally on the vise bed through the medium of rails 8 and guides 9. The movable jaw is provided on the front surface thereof with a jaw plate 5a. The two jaw plates 3a, 5a are in parallel with each other and are at right angles to the surface of the slide for the movable jaw.

Figure 3:
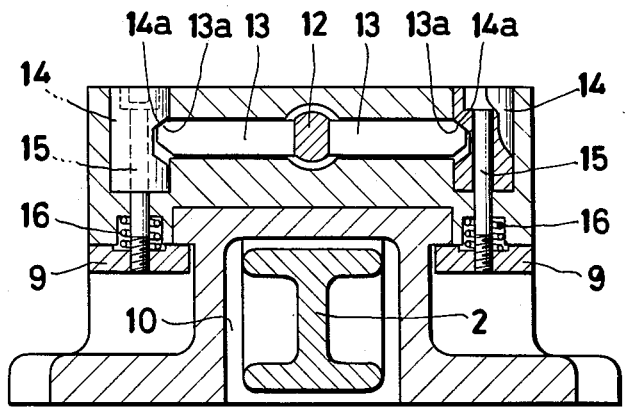
FIG. 3 is a sectioned view taken along the line III—III of FIG. 1.

A screw bar 6 is used as a driving member for imparting forward and backward movement to the movable jaw 5. The screw bar 6 is supported by being engaged with a screw seat 7, and one end of the screw bar 6 is shaped to form a large-diameter portion 6a and the other end thereof is provided with a head portion 6b for the installation of a rotary handle (not shown) thereon. The large-diameter portion 6a is disposed inside the movable jaw 5 and retained unreturnably by a check plate 11. A wedge 12 is disposed in front of the large-diameter portion 6a of the screw bar 6. In this embodiment, as means for transmitting the driving force produced by the advance of the screw bar 6, two transmission bars 13 disposed on the leading end of the wedge 12 and formed in the shape of two sides of the letter "V" are used. The transmission bars are inserted into the "V"-shaped holes bored in the movable jaw so as to extend to the portions in the neighborhood of the two lateral sides of the jaw plate 5a of the movable jaw 5. The diameter of the "V"-shaped holes is formed to have substantially no clearance when the transmission bars 13 are inserted. The portions of the movable jaw 5 in the neighborhood of the jaw plate 5a have vertical holes bored to perpendicularly intersect relative to the "V"-shaped holes for permitting the insertion of vertical annual shafts 14 provided on the peripheral surfaces thereof with tapering notches 14a. The leading ends of the transmission bars are tapered and held in engagement with the upper portions of the tapering notches 14a of the vertical shafts 14. The vertical shafts 14 are pierced one each with bolts 15 which are planted in the guides 9 held in engagement with the rails 8 of the vise bed 1. The portions 9' of the guides 9 in the neighborhood of the jaw plate of the movable jaw have a "U"-shaped cross section (FIG. 5), one of the ridges of the "U"-shaped cross section coming into intimate contact with the bottom surface of the movable jaw 5 and the other ridge coming into close contact with the bottom surface of the rail 8 (FIG. 3). A spring 16 for permitting the insertion therethrough of the bolt 15 serves to force the guide in the downward direction to thereby smoothen the slide of the guide on the rail and prevent the bolt 15 from being loosened. As described above, the driving force produced by the advance of the screw bar 6 is divided into two forces which are transmitted through the two transmission bars to the portions near the lateral sides of the jaw plate 5a, with the result that the movable jaw 5 is moved toward the stationary jaw 3.

An L-shaped frame 2 is separately disposed throughout a cavity 10 formed in the longitudinal direction inside the vise bed 1. One end 2a of the L-shaped frame has the screw seat 7 fastened thereto and supported thereon, and the screw seat 7 protrudes from a hole 19 bored in the vise bed 1 behind the movable jaw 5 and supports the screw bar 6 therein. The other end 2b of the L-shaped frame is fixed with bolts to the interior of the stationary jaw 3. The vise bed, stationary jaw, movable jaw and L-shaped frame of the present invention are cast of the same steel etc. as is used for existing vises. The L-shaped frame is formed in a cross section capable of absorbing the bending stress generated in the longitudinal direction, such as in the shape of the letter "H" as illustrated in FIG. 3.

In the second embodiment illustrated in FIGS. 7 and 8, a transmission plate 17 possessing an oblique surface 17a as illustrated is used in the place of the transmission bars 13 serving as the means for transmitting the driving force of the screw bar 6 in the first embodiment. In the case of the machine vise using this transmission plate 17, the insertion of the plate 17 into the movable jaw 5 is obtained by the removal of setscrews 18a from the lid 18. The upper portions of the lateral sides of the oblique surface 17a formed on the leading end of the transmission plate 17 are held in engagement with the upper portions of the tapering notches 14a provided on the peripheral surfaces of the vertical shafts 14 and the remaining portions of the leading end of the plate 17 are held in a non-contact state with the movable jaw 5. Other parts of the structure than the above-mentioned are identical with that of the first embodiment.

In the machine vise of the construction as described above, a work blank 20 is brought into contact with the stationary jaw and with the movable jaw by disposing the work blank 20 between the two jaws, rotating the screw bar 6 to thereby advance the driving force produced by the rotation of the screw bar via the wedge 12 and transmission bars 13 (or transmission plate 17) toward the vertical shafts 14, with the result that the movable jaw 5 is slid on the rails 8 toward the stationary jaw 3. Since the movable jaw rises off the upper surfaces of the rails by the thickness of an oily film (10 to 20μ in general) and since the guides 9 are forced in the downward direction by the springs 16 to form an interval of about 10 to 20μ from the lower surfaces of the rails, the movable jaw can smoothly be slid on the surface 21 of the slide for the movable jaw.

When the screw bar is further rotated to fasten and grasp the work blank between the two jaws, since the screw bar is supported on the screw seat 7 fixed to the L-shaped frame 2, the bending stress is exerted upon the L-shaped frame as shown in FIG. 6, to illustrate an extreme case. However, since the L-shaped frame 2 has no direct connection with the vise bed 1, the bending stress is not exerted at all upon the vise bed. The L-shaped frame is formed in a shape capable of absorbing the bending stress to some extent. Therefore, by causing the jaw plates of the two jaws to be at right angles to the surface 21 of the vise bed for allowing the movable jaw to slide thereon, the work blank can be grasped between the two surfaces each kept at a precise right angle relative to the surface 21 at all times.

On the other hand, the driving force produced by the aforementioned further rotation of the screw bar 6 is divided into two forces and forwarded to the vertical shafts 14 via the wedge 12 and transmission bars 13 (or transmission plate 17) and causes the oblique surfaces 13a of the transmission bars to be brought into engaging contact with the upper portions of the tapering notches 14a provided on the peripheral surfaces of the vertical shafts 14. Therefore, the movable jaw advances toward the stationary jaw and is prevented from further advancing by the existence of the work blank. At this time, the oblique surfaces of the transmission bars apply high pressure to the upper portions of the tapering notches of the vertical shafts, with the result that downward force is exerted upon the transmission bars and upward force is exerted upon the vertical shafts. Since the transmission bars are firmly engaged with the movable jaw, the movable jaw is pressed against the rails 8 to remove the oily film from between the movable jaw and the rails and is forcibly directed to the sliding surface 21 for the movable jaw, with the result that the work blank grasped between the two jaw plates is maintained in contact with the sliding surface 21. Since the vertical shafts upon which upward force acts are fixed to the guides 9 with the bolts 15, the guides come into pressure contact with the lower surfaces of the rails against the force of the springs 16. Thus, the movable jaw is given forces from the upward and downward directions relative to the rails. Therefore, the movable jaw and the vise bed are associated closely with each other as though they form one integral unit. This means that the machine vise as a whole acquires greatly enhanced rigidity and, because of the absence of play in the movable jaw, enjoys notably increased structural strength. Since no bending stress is exerted upon the two jaws irrespective of the pushing strength of the movable jaw which is given to the work blank, the work blank can be grasped between the two jaws in a state wherein the jaw plates keep their postural angle relative to the sliding surface of the vise bed for the movable jaw at a precise right angle at all times and in a stable state because the movable jaw and the vise bed are associated closely with each other by the degree of the pushing strength of the movable jaw on the work blank and at the same time the driving force produced by the advance of the screw bar is transmitted to the two ends of the jaw plate 5a of the movable jaw.

As described in detail above, according to the machine vise of the present invention, a work blank can be grasped between the stationary jaw and the movable jaw in a state wherein the jaw plates of the two jaws keep their postural angle relative to the sliding surface of the vise bed for the movable jaw at a precise right angle at all times without exerting bending stress upon the vise bed side even when the grasping and fastening of the work blank is effected by the rotation and advance of the screw bar. Further since the movable jaw is given force in the downward direction in proportion as the fastening force of the movable jaw to the work blank is large and prevents the work blank from rising off the sliding surface of the vise bed for the movable jaw, the present invention makes it unnecessary to take the heretofore required steps of hitting the work blank with a hammer etc. to bring it into contact with the sliding surface and of giving the jaw plates inclination beforehand. Since the work blank is grasped between the two jaws in a state wherein the vise bed and the movable jaw are associated closely with each other, the machine vise as a whole enjoys notably increased structural strength and stable cutting of the work blank and, therefore, the cutting tool used on the work blank enjoys a lengthened service life. The machine vise, therefore, permits the work blank to be cut easily with high accuracy without involving the heretofore observed troublesome practice which relies on the machinist's experience and skill. The machine vise itself enjoys increased durability and provides highly reliable cutting work stably for a long time.

What is claimed is:

1. A machine vise for grasping a work blank by a stationary jaw and a movable jaw adapted to move straight toward and away from the stationary jaw, which machine vise comprises:

a vise bed possessing a cavity therein throughout the entire length thereof, a pair of rails formed on the longitudinal upper edges of the vise bed, a stationary jaw provided with a jaw plate and fixed in position on one end of the vise bed, a movable jaw provided on the front surface thereof with a jaw plate which is in parallel with said jaw plate of said stationary jaw and provided with guides adapted for intimate engagement with said pair of rails and mounted on said vise bed freely movably toward and away from said stationary jaw, an L-shaped frame separately disposed throughout in the longitudinal direction of said cavity in said vise bed and possessing one end fastened inwardly to said stationary jaw, driving means supported in position on the other end of said L-shaped frame and adapted to impart forward or backward movement to said movable jaw, vertical shafts disposed on the jaw plate side of said movable jaw and retained in position by bolts planted in said guides, and means disposed inside said movable jaw and adapted to transmit the driving force issuing from said driving means to said movable jaw, with one end of said means connected to said driving means and the other end thereof to said vertical shafts.

2. The machine vise according to claim 1, wherein said means connected to said vertical shafts for transmitting the driving force to said movable jaw has an edge provided with a tapering oblique surface, and the peripheral surfaces of said vertical shafts are provided one each with tapering notches, whereby the driving force generated by said driving means causes said movable jaw to move toward said stationary jaw while said guides keep intimate contact with said rails.

3. The machine vise according to claim 2, wherein said means connected to said vertical shafts for transmitting the driving force to said movable jaw comprises a pair of bar-shaped members.

4. The machine vise according to claim 2, wherein said means connected to said vertical shafts for transmitting the driving force to said movable jaw comprises one plate-shaped member.

5. The machine vise according to claim 1, wherein said L-shaped frame has a cross section of the shape of the letter "H" lying on its side.

* * * * *